(12) United States Patent
Mehl et al.

(10) Patent No.: US 11,946,869 B2
(45) Date of Patent: Apr. 2, 2024

(54) METHOD FOR DETERMINING THE THERMAL DONOR CONCENTRATION OF A SEMICONDUCTOR SAMPLE

(71) Applicants: COMMISSARIAT À L'ÉNERGIE ATOMIQUE ET AUX ÉNERGIES ALTERNATIVES, Paris (FR); NORWEGIAN UNIVERSITY OF LIFE SCIENCES, Ås (NO)

(72) Inventors: Torbjørn Mehl, Ås (NO); Espen Olsen, Ås (NO); Ingunn Burud, Ås (NO); Lisa Kvalbein, Ås (NO); Elénore Letty, Grenoble (FR); Wilfried Favre, Grenoble (FR); Jordi Veirman, Grenoble (FR)

(73) Assignees: COMMISSARIAT A L'ENERGIE ATOMIQUE ET AUX ENERGIES ALTERNATIVES, Paris (FR); NORWEGIAN UNIVERSITY OF LIFE SCIENCES, Ås (NO)

( * ) Notice: Subject to any disclaimer, the term of this patent is extended or adjusted under 35 U.S.C. 154(b) by 574 days.

(21) Appl. No.: 17/276,040

(22) PCT Filed: Sep. 13, 2019

(86) PCT No.: PCT/EP2019/074537
§ 371 (c)(1),
(2) Date: Mar. 12, 2021

(87) PCT Pub. No.: WO2020/053413
PCT Pub. Date: Mar. 19, 2020

(65) Prior Publication Data
US 2022/0050055 A1 Feb. 17, 2022

(30) Foreign Application Priority Data
Sep. 14, 2018 (EP) .................................. 18306196

(51) Int. Cl.
*G01N 21/64* (2006.01)
*G01N 21/95* (2006.01)

(52) U.S. Cl.
CPC ..... *G01N 21/6489* (2013.01); *G01N 21/6402* (2013.01); *G01N 21/9501* (2013.01); *G01N 2201/06113* (2013.01)

(58) Field of Classification Search
None
See application file for complete search history.

(56) References Cited

U.S. PATENT DOCUMENTS

| 2007/0095274 A1 | 5/2007 | Sugimura et al. |
| 2015/0338276 A1 | 11/2015 | Nakagawa et al. |

(Continued)

FOREIGN PATENT DOCUMENTS

| FR | 2 964 459 A1 | 3/2012 |
| FR | 3 009 380 A1 | 2/2015 |

(Continued)

OTHER PUBLICATIONS

Pizzini et al. "The photoluminescence emission in the 0.7-0.9 eV range from oxygen precipitates, thermal donors and dislocations in silicon" J. Phys.: Condens. Matter 12 (2000) (Year: 2000).*

(Continued)

*Primary Examiner* — Edwin C Gunberg
(74) *Attorney, Agent, or Firm* — Pillsbury Winthrop Shaw Pittman LLP

(57) ABSTRACT

A method for determining the thermal donor concentration of a test sample made of a semiconductor material, includes providing a reference sample made of the same semiconductor material and having a known thermal donor concentration; measuring a photoluminescence signal of the reference sample for a photon energy comprised between 0.65 eV and 0.8 eV, the photoluminescence signal of the reference (Continued)

sample exhibiting an intensity peak in a photon energy range of 0.65 eV to 0.8 eV; determining, from the photoluminescence signal, an experimental relationship between the thermal donor concentration and a parameter representative of the intensity peak; measuring a photoluminescence signal of the test sample for at least one photon energy comprised between 0.65 eV and 0.8 eV; determining from the photoluminescence signal a specific value of the parameter; and determining the thermal donor concentration from the specific value of the parameter by using the experimental relationship.

11 Claims, 4 Drawing Sheets

(56) References Cited

U.S. PATENT DOCUMENTS

| | | |
|---|---|---|
| 2017/0176105 A1 | 6/2017 | Dubois et al. |
| 2018/0231468 A1 | 8/2018 | Nakagawa et al. |

FOREIGN PATENT DOCUMENTS

| | | |
|---|---|---|
| JP | 2018-142580 A | 9/2018 |
| WO | WO 2018/046855 A1 | 3/2018 |

OTHER PUBLICATIONS

Mehl et al. "Oxygen-related defects in n-type Czochralski silicon wafers studied by hyperspectral photoluminescence imaging" Energy Procedia 124, 107-112 (2017) (Year: 2017).*

Helander, Martin, "Thermal Donors in Czochralski Silicon Wafers Investigated by Spectral Imaging" (Norwegian University of Life Sciences, masters thesis 2018) (Year: 2018).*

Yang, Yubo, "Photoluminescence Studies of Thermal Donors in Silicon" (Simon Fraser University, masters thesis, 1995) (Year: 1995).*

International Search Report as issued in International Patent Application No. PCT/EP2019/074537, dated Nov. 26, 2019.

Extended European Search Report as issued in European Patent Application No. 18306196.9, dated Mar. 4, 2019.

Binetti, S., et al., "Photoluminescence and infrared spectroscopy for the study of defects in silicon for photovoltaic applications," Solar Energy Materials & Solar Cells, vol. 130, (2014), pp. 696-703.

Tomassini, M., et al., "Recombination activity associated with thermal donor generation in monocrystalline silicon and effect on the conversion efficiency of heterojunction solar cells," Journal of Applied Physics 119, 084508 (2016).

Hamada, M., et al., "Characterization of Czochralski Silicon Wafers Grown at a Low Growth Rate by Spectroscopy," Jpn. J. Appl. Phys., vol. 35, (1996), pp. 182-185.

Broisch, J., et al., "A New Method for the Determination of the Dopant-Related Base Resistivity Despite the Presence of Thermal Donors," IEEE Journal of Photovoltaics, vol. 5, No. 1, Jan. 2015, pp. 269-275.

Higuchi, F., et al., "Photoluminescence due to early-stage of oxygen precipitation in multicrystalline Si for solar cells," Japanese Journal of Applied Physics 56, 070308 (2017).

Richter, A., et al., "Improved quantitative description of Auger recombination in crystalline silicon," Physical Review B 86, 165202 (2012).

Lim, S. Y., et al., "Applications of Photoluminesoenoe Imaging to Dopant and Carrier Concentration Measurenlents of Silicon Wafers," IEEE Journal of Photovoltaics. vol. 3, No. 2, Apr. 2013, pp. 649-655.

Brinkevich, D. I., et al., "Kinetics of formation of thermal donors in Si:Ge:O crystals," Soviet Physics Semiconductors, American Institute of Physics, vol. 26, No. 4, Apr. 1992, pp. 383-387.

* cited by examiner

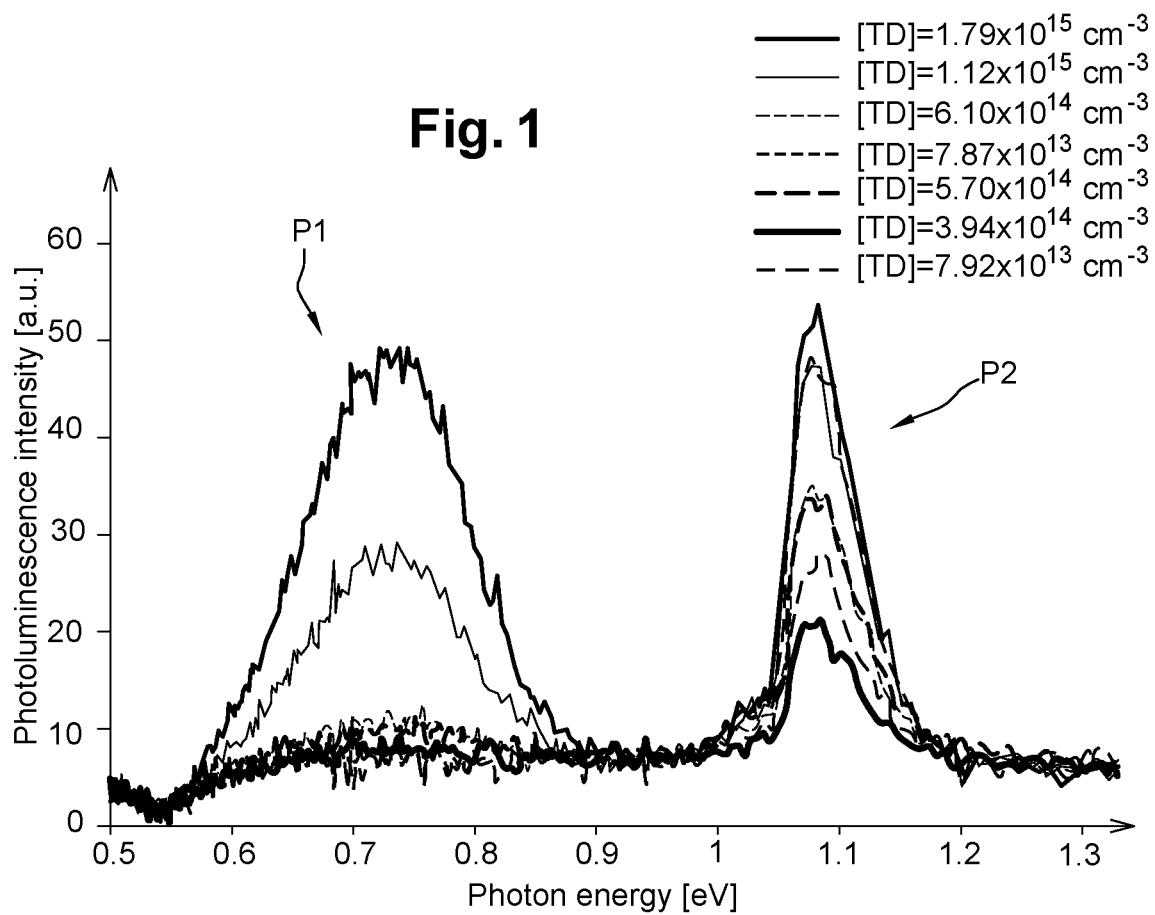
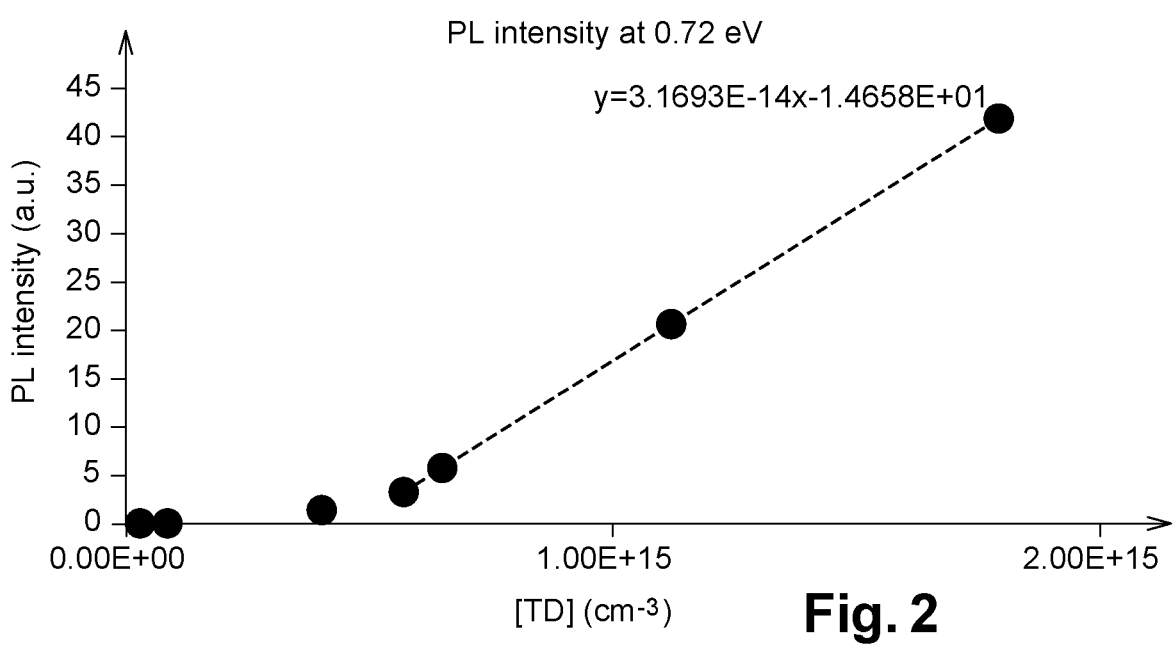

METHOD FOR DETERMINING THE THERMAL DONOR CONCENTRATION OF A SEMICONDUCTOR SAMPLE

CROSS-REFERENCE TO RELATED APPLICATIONS

This application is the U.S. National Stage of PCT/EP2019/074537, filed Sep. 13, 2019, which in turn claims priority to European patent application number 18306196.9 filed Sep. 14, 2018. The content of these applications are incorporated herein by reference in their entireties.

TECHNICAL FIELD

The present invention relates to a method for determining the thermal donor concentration of a semiconductor sample, such as a Czochralski silicon wafer used to manufacture a photovoltaic cell, and to a method for sorting semiconductor wafers.

STATE OF THE ART

It is estimated that 10% to 20% of commercial Czochralski single-crystal silicon (CZ-Si) wafers are not compatible with the manufacturing of high efficiency photovoltaic devices. Particularly, wafers sampled from the top of a Cz-Si ingot contains defects that limit the carrier lifetime and lead to efficiency reductions by up to 4% absolute, for both silicon heterojunction (SHJ) and silicon homojunction (SHMJ) solar cells. These defects are mainly thermal donors and oxide precipitates.

Thermal donors are small oxygen cluster formed during the cooling of the ingot, between 350° C. and 500° C. The thermal donor concentration (hereinafter "[TD]") of the ingot at the end of the crystal growth is governed by the interstitial oxygen concentration as well as the cooling velocity of the ingot.

Thermal donors are typically destroyed by annealing at a temperature higher than 600° C. The manufacturing process of SHJ solar cells being a low-temperature (below 250° C.) process, thermal donors are not eliminated during manufacturing of SHJ solar cells and therefore limit the performances of these cells, especially the efficiency. This is not the case for SHMJ solar cells, since their manufacturing process comprises high temperature steps (above 600° C.) that destroy thermal donors. However, the oxide precipitate nuclei that are present in the thermal donors-rich wafers (sliced from the ingot top) may, as a result of these high temperature steps, grow in the form of silicon oxide precipitates. These oxide precipitates limit the efficiency of the SHMJ solar cells, as thermal donors would do in SHJ cells.

Silicon wafers having a high thermal donor concentration in the "as-cut" (or "as-received") state will very likely have a high oxide precipitate density. It is therefore highly desirable to know the thermal donor concentration of as-cut wafers, in order to estimate the quality of the wafers before they enter the manufacturing process of high-efficiency solar cells.

Patent FR3009380 discloses a method for determining the thermal donor concentration [TD] of a CZ-Si wafer by means of two resistivity measurements, one before a rapid thermal annealing (preferably above 600 C) and the other after the annealing. Such a method is compatible with the industry requirements in terms of throughput. However, the annealing step is costly and special care must be taken to preserve quality of the wafer (for instance a neutral atmosphere).

International application WO2018/046855 discloses a method for sorting CZ silicon wafers in the as-cut state, based on a value of the bulk carrier lifetime determined for each wafer. This method relies on an indirect estimation of the thermal donor concentration [TD] at the wafer center using photoluminescence. The photoluminescence intensity measured after illuminating the wafer center is proportional to the majority free carrier concentration (noted "n" in n-type silicon and "p" in p-type silicon), which is influenced by the presence of thermal donors. The method therefore comprises a step of measuring the majority free carrier concentration n/p using photoluminescence and a step of determining the thermal donor concentration [TD] from the majority free carrier concentration n/p.

The majority free carrier concentration n/p is not directly proportional to the thermal donor concentration [TD] and varies also in function of the (intentionally introduced) donor dopant concentration $N_D$ or the (intentionally introduced) acceptor dopant concentration $N_A$. In order to calculate the term [TD], the dopant concentration $N_D/N_A$ at the wafer center is determined from a measurement of the photoluminescence signal at the wafer edge by making two assumption. The first assumption is that there is no thermal donor present at the wafer edge, due to the lower oxygen concentration at the wafer edge. The second assumption is that the dopant concentration $N_D/N_A$ is spatially homogeneous across the wafer, so that the $N_D/N_A$ value at the wafer center can be set equal to $N_D/N_A$ value as measured at the wafer edge.

These assumptions may lead to a significant error (up to 30%) in the estimation of the dopant concentration $N_D/N_A$, and therefore to a similar error in the determination of the thermal donor concentration [TD]. Indeed, according to Broisch et al. in document ["A new method for the determination of the dopant-related base resistivity despite the presence of thermal donors", IEEE Journal of Photovoltaics, Vol. 5, No. 1, 2015], thermal donors may still be present in appreciable amounts at the wafer edge. Furthermore, dopant concentration $N_D/N_A$ may vary by more than 20% across the diagonal of the wafer.

SUMMARY OF THE INVENTION

There is therefore a need to provide an accurate, non-expensive and non-destructive to method to quantify the amount of thermal donors in a semiconductor sample, such as a Czochralski silicon wafer.

According to a first aspect of the invention, this need is satisfied by providing a method for determining the thermal donor concentration of a test sample made of a semiconductor material, the method comprising the following steps:
  providing a reference sample made of the same semiconductor material and having a known thermal donor concentration;
  measuring with a photoluminescence tool a photoluminescence signal of the reference sample for at least one photon energy comprised between 0.65 eV and 0.8 eV, the photoluminescence signal of the reference sample exhibiting an intensity peak in a photon energy range of 0.65 eV to 0.8 eV;
  determining, from the photoluminescence signal of the reference sample, an experimental relationship between the thermal donor concentration and a parameter representative of the intensity peak;

measuring with the photoluminescence tool a photoluminescence signal of the test sample for at least one photon energy comprised between 0.65 eV and 0.8 eV;

determining from the photoluminescence signal of the test sample a specific value of said parameter; and determining the thermal donor concentration of the test sample from the specific value of said parameter by using said experimental relationship.

The thermal donor concentration of the test sample can be easily and accurately determined through the use of the photoluminescence technique and the experimental relationship between the thermal donor concentration and the intensity peak of the photoluminescence signal. Indeed, this experimental relationship (or "calibration law") allows for a direct estimation of the thermal donor concentration from the photoluminescence signal of the test sample, without making any assumption on the distribution of the thermal donors or others dopants in the wafer. Furthermore, photoluminescence is a fast and accurate characterization technique compatible with throughput requirements of solar cell manufacturing.

In one embodiment of this characterizing method, the parameter representative of the intensity peak is the photoluminescence signal intensity obtained for one photon energy comprised between 0.65 eV and 0.8 eV, preferably between 0.70 eV and 0.75 eV.

In another embodiment, said parameter is the integral of the photoluminescence signal intensity over at least a part of the photon energy range of 0.65 eV to 0.8 eV.

The method according to the first aspect of the invention may also have one or more of the following characteristics, considered individually or according to any technically possible combinations thereof:
- the experimental relationship between the thermal donor concentration and the parameter representative of the intensity peak is linear; and
- the reference sample has a known thermal donor concentration greater than $5 \times 10^{14}$ cm$^{-3}$.

A second aspect of the invention relates to a method for sorting wafers in an as-cut state or in a surface-shaped state, the wafers being made of a semiconductor material. The sorting method comprising the followings steps:

providing a reference sample made of the same semiconductor material and having a known thermal donor concentration;

measuring with a photoluminescence tool a photoluminescence signal of the reference sample for at least one first photon energy comprised between 0.65 eV and 0.8 eV, the photoluminescence signal of the reference sample exhibiting a first intensity peak in a first photon energy range of 0.65 eV to 0.8 eV;

determining, from the photoluminescence signal of the reference sample, a first experimental relationship between the thermal donor concentration and a first parameter representative of the first intensity peak;

measuring with the photoluminescence tool a photoluminescence signal of each wafer for at least the first photon energy;

determining from the photoluminescence signal of each wafer a specific value of said first parameter;

determining the thermal donor concentration of each wafer from the specific value of said first parameter by using said first experimental relationship;

determining the majority free carrier concentration of each wafer;

calculating a value of the bulk carrier lifetime of each wafer from the thermal donor concentration and the majority free carrier concentration of each wafer;

comparing the value of the bulk carrier lifetime of each wafer to a threshold value; and excluding the wafer when the value of the bulk carrier lifetime is lower to the threshold value.

In a preferred embodiment of the sorting method, the determination of the majority free carrier concentration of each wafer comprises the followings steps:

determining the majority free carrier concentration of the reference sample;

measuring with the photoluminescence tool the photoluminescence signal of the reference sample for at least one second photon energy comprised between 1.05 eV and 1.15 eV, the photoluminescence signal of the reference sample exhibiting a second intensity peak in a second photon energy range of 1.05 eV to 1.15 eV;

determining, from the photoluminescence signal of the reference sample, a second experimental relationship between the majority free carrier concentration and a second parameter representative of the second intensity peak;

measuring with the photoluminescence tool the photoluminescence signal of each wafer for at least the second photon energy;

determining from the photoluminescence signal of each wafer a specific value of said second parameter; and determining the majority free carrier concentration of each wafer from the specific value of said second parameter by using said second experimental relationship.

The photoluminescence signal of the reference sample is advantageously measured for at least the first photon energy and for at least the second photon energy in a single measuring operation.

The photoluminescence signal of each wafer is advantageously measured for at least the first photon energy and for at least the second photon energy in a single measuring operation.

The photoluminescence signal of each wafer is preferably measured at the wafer to center.

BRIEF DESCRIPTION OF THE FIGURES

Other characteristics and advantages of the invention will become clear from the description that is given thereof below, by way of indication and in no way limiting, with reference to the appended figures, among which:

FIG. 1 represents the photoluminescence spectrum of several reference samples having different values of thermal donor concentration;

FIG. 2 represents the photoluminescence peak intensity of the reference samples, obtained for a photon energy of 0.72 eV, in function of the thermal donor concentration;

For greater clarity, identical or similar elements are marked by identical reference signs in all of the figures.

DETAILED DESCRIPTION OF AT LEAST ONE EMBODIMENT

Figure 3:
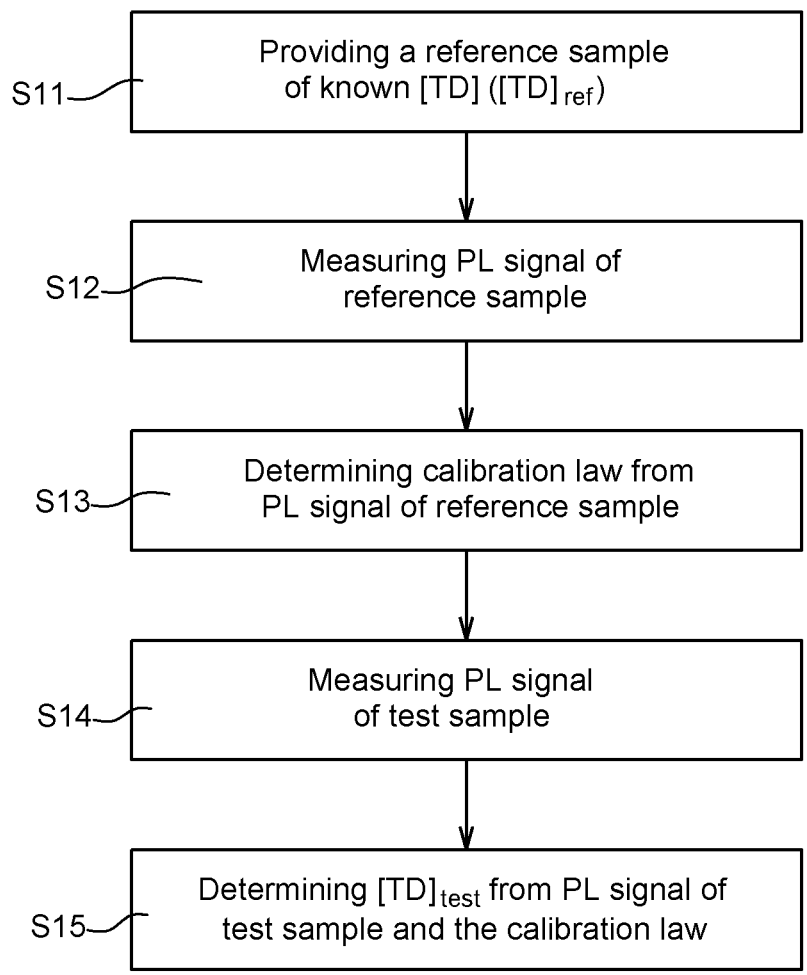
FIG. 3 represents steps of a method for determining the thermal donor concentration according to the first aspect of the invention.

Document ["Characterization of Czochralski silicon wafers grown at a low growth rate by photoluminescence spectroscopy", Hamada M. et al., Jpn. J. Appl. Phys., Vol. 35, pp. 182-185, 1996] discloses that the photoluminescence spectrum at room temperature of an as-grown silicon wafer, sampled from an ingot pulled at a low growth rate (0.8 mm/min), exhibits a peak at a photon energy of 0.75 eV and that this peak is related to thermal donors generated during the cooling process of the ingot.

The relationship between this photoluminescence peak and the thermal donors has been further investigated, by providing seven reference wafers having different values of thermal donor concentration [TD]. These values of thermal donor concentration [TD] have been measured on "twin" wafers (i.e. seven wafers identical to the reference wafers and having therefore the same values of thermal donor concentration [TD]), using the method disclosed in patent FR3009380.

FIG. 1 represents the photoluminescence spectrum of the seven reference wafers. Each photoluminescence spectrum has been measured at room temperature (about 295 K) with an HgCdTe photodetector, after illuminating the wafer center with a semiconductor laser. The photoluminescence setup comprises the following parameters: a laser wavelength of 808 nm, a laser intensity of about 2 W/cm$^2$ and an exposure time of 20 ms. As partially expected, a first broad peak P1 appears for several photoluminescence spectra in a photon energy range extending approximately from 0.65 eV to 0.8 eV.

FIG. 1 further demonstrates that the amplitude of the first peak P1 (i.e. the maximum intensity of photoluminescence signal) increases with increasing thermal donor concentration [TD]. This tendency has not been shown until now, especially in the above-mentioned document.

The photoluminescence intensity at 0.72 eV (where each peak P1 "peaks") has then been extracted from the spectra of FIG. 1 and plotted as of function of the thermal donor concentration [TD] in FIG. 2. Each value of photoluminescence intensity has been obtained by subtracting the baseline signal (corresponding to the background noise of FIG. 1) from the photoluminescence peak amplitude. This baseline signal is here set equal to 5 counts (a count being proportional to the quantity of photons detected by the camera sensor of the photoluminescence tool).

FIG. 2 thus shows that the photoluminescence intensity at the first peak P1 (here around 0.72 eV) vary linearly in function of the thermal donor concentration [TD], above a threshold value of $5 \times 10^{14}$ cm$^{-3}$. The linear relationship between the photoluminescence peak intensity $I_{PL}$ and the thermal donor concentration [TD] (for [TD]>$5 \times 10^{14}$ cm$^{-3}$) can be expressed as follows:

$$I_{PL} = 3.1693 \times 10^{14} \times [TD] - 14,658$$

This kind of relationship may be advantageously used in a method for quickly and to accurately determining the thermal donor concentration $[TD]_{test}$ of a test semiconductor sample.

FIG. 3 represents steps S11-S15 of such a determining method. The test semiconductor sample is preferably a silicon wafer in the as-cut state, as that used for solar cell manufacturing. The "as cut" (or "as-received") state refers to the state in which the wafer is received from the ingot manufacturer. In this state, the wafer has not yet undergone any step of a semiconductor device manufacturing process (such as texturing, doping, passivation or annealing steps), with the exception of a cleaning step for removing cutting residues. The thermal donor concentration $[TD]_{test}$ is determined for at least one area of the wafer, preferably at the wafer center.

Steps S11 to S13 are directed to the calibration of the photoluminescence signal since, for a given sample, its intensity will vary depending on the photoluminescence tool and on the photoluminescence measurement conditions.

At step S11, a reference sample having a known thermal donor concentration $[TD]_{ref}$ is provided. The thermal donor concentration $[TD]_{ref}$ of the reference sample is greater than a threshold value (called "detection threshold"), from which a photoluminescence peak can be detected in the range [0.65 eV-0.8 eV]. This threshold value is here equal to $5 \times 10^{14}$ cm$^{-3}$, unexpectedly coinciding with the limit below which the thermal donors are no longer considered as harmful (and thus below which an accurate estimation of their concentration is not required).

The reference sample is made of the same semiconductor material (e.g. silicon) as the test sample to be characterized. To achieve a high accuracy in the determination of the thermal donor concentration of the test sample, the thickness of the reference sample is advantageously similar to the thickness of the test sample (±10%), and preferably lower than 200 µm.

During step S12, a photoluminescence signal of the reference sample is measured using the photoluminescence tool, for at least one photon energy comprised between 0.65 eV and 0.8 eV. The photoluminescence signal of the reference sample is preferably a spectrally resolved photoluminescence signal, i.e. a signal measured for to many photon energies in the range [0.65 eV-0.8 eV] (all photon energies may be measured at the same time with a hyperspectral push-broom camera). In this photon energy range, the intensity of photoluminescence signal exhibits a first peak P1 related to thermal donors (as discussed in relation to FIG. 1).

The reference sample is preferably selected so that its thermal donor concentration $[TD]_{ref}$ is above $10^{15}$ cm$^{-3}$. The photoluminescence peak P1 related to thermal donors will be thus easily detectable. The thermal donor concentration $[TD]_{ref}$ may have been measured on a twin wafer using the method disclosed in patent FR3009380.

The photoluminescence tool comprises an excitation source, typically a laser (for example a semiconductor laser) for illuminating the reference sample and a photodetector (preferably a HgCdTe infrared-detector focal-plane array with a bandgap above 0.5 eV) for detecting photoluminescence of the reference sample. For cost and productivity reasons, the photoluminescence measurement is preferably performed at room temperature (about 295 K). The setup of photoluminescence tool (i.e. the set of photoluminescence measurement conditions) may include a laser intensity comprised between 0.1 W/cm$^2$ and 10 W/cm$^2$ and an exposure time comprised between 0.1 ms and 1000 ms. The laser wavelength is advantageously chosen between 800 nm and 1700 nm, ideally around 900 nm, in order for the photon absorption to occur far from the surfaces of the sample and within the bulk material to be characterized.

Step S13 consists in determining from the photoluminescence signal of the reference sample an experimental relationship, called hereinafter "calibration law", between the thermal donor concentration (of any sample) and a first parameter representative of the photoluminescence peak P1 in the range [0.65 eV-0.8 eV]. This calibration law is preferably linear (based on the findings related to FIG. 2). By making the assumption of a zero parameter value for a thermal donor concentration [TD] equal to the detection threshold (e.g. $5\times10^{14}$ cm$^{-3}$), the calibration law may be fast and simple to establish, with only one reference sample.

According to a first embodiment of the determining method, the first parameter representative of the photoluminescence peak P1 is the photoluminescence signal intensity $I_{PL}$ obtained for one photon energy comprised between 0.65 eV and 0.8 eV, to preferably between 0.70 eV and 0.75 eV (where the amplitude of the peak P1 is generally the highest) to improve accuracy of the method.

Figure 4:
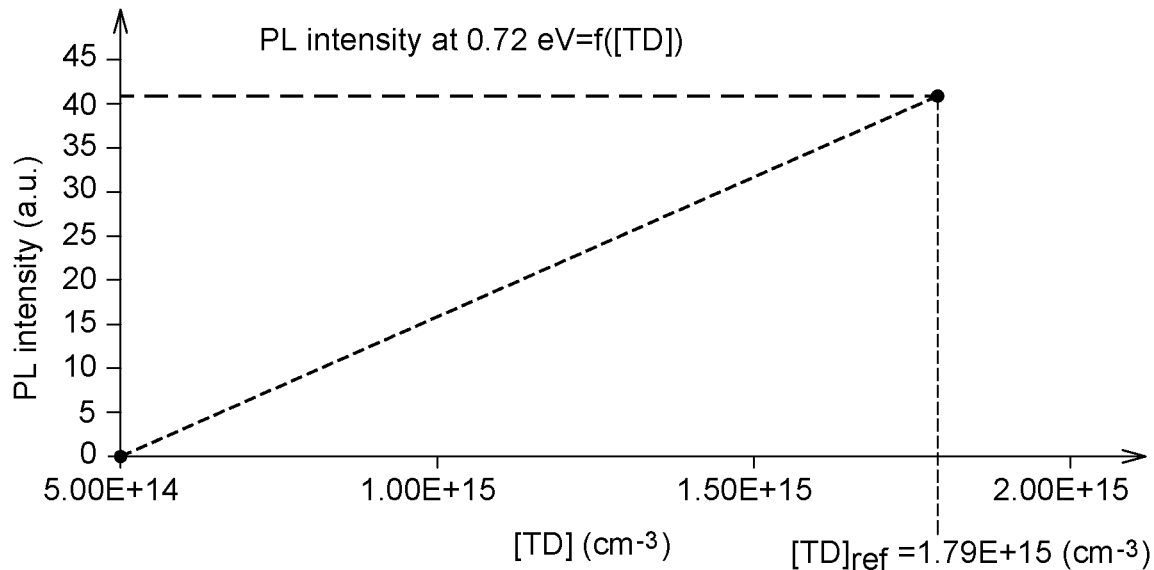
FIG. 4 shows a first calibration curve representing the photoluminescence peak intensity at 0.72 eV in function of the thermal donor concentration.

FIG. 4 shows an example of calibration law, representing (in the form of a curve instead of a mathematical relationship) the photoluminescence intensity at 0.72 eV in function of the thermal donor concentration [TD]. The photoluminescence intensity of the reference sample is here equal to 42 a.u. (arbitrary unit) (after subtraction of the baseline signal) for a thermal donor concentration $[TD]_{ref}$ of $1.79\times10^{15}$ cm$^{-3}$.

In a second embodiment, the first parameter representative of the photoluminescence peak is the integral of the photoluminescence signal intensity over at least a part of the photon energy range of 0.65 eV to 0.8 eV, and preferably over the entire energy range [0.65 eV-0.8 eV]. Compared to the first embodiment, this second embodiment enables a more accurate calibration law to be obtained.

More than one reference sample may be provided at step S11 and measured at step S12 to establish the calibration law. Linear regression of several parameter values may then be used to improve accuracy of the calibration process, to the detrimental of both implementation speed and costs.

Referring again to FIG. 3, the determining method then comprises a step S14 of measuring a photoluminescence signal of the test sample. The photoluminescence signal of the test sample is measured using the same photoluminescence tool and with the same measurement conditions as those used for the reference sample (step S12). This second photoluminescence measurement is further performed for the same photon energy (or energies) as that selected for the reference sample (in the range [0.65 ev-0.8 eV]).

In the case of test sample in the form of a wafer, the photoluminescence signal is preferably measured during step S14 at the wafer center, since the thermal donor concentration [TD] is known to be higher at this location (owing to a higher oxygen concentration). For each photon energy, the photoluminescence signal is advantageously averaged over an area (for example a 15×15 pixels area) at the wafer center to improve signal/noise ratio.

Step S15 consists in determining the thermal donor concentration $[TD]_{test}$ of the test sample, from its photoluminescence signal measured at step S14 and the calibration law determined at step S13.

Step 15 comprises two operations. During the first operation, a specific (to the test sample) value of the first parameter is determined from photoluminescence signal of the test sample. If the first parameter is the photoluminescence signal intensity $I_{PL}$ obtained for one particular photon energy, then the specific value of the first parameter is extracted from the photoluminescence signal, i.e. selected from the at least one intensity value measured at step S14). If the first parameter is the integral of the photoluminescence signal intensity, then the specific value of the first parameter is calculated from all photoluminescence intensity values in the integration range. During the second operation, the thermal donor concentration $[TD]_{test}$ of the test sample is determined from the specific value of the first parameter using the calibration law of step S13. This determination may be performed graphically (in the case of a calibration curve as shown on FIG. 4) or algebraically (in the case of a mathematical relationship).

Thus, no assumption on the thermal donor concentration or the dopant concentration is made in the determining method of FIG. 3. This ensures a high accuracy to the determining method.

Photoluminescence is a fast, accurate and widespread characterizing technique for semiconductor samples, for example in the wafer form. Contrary to annealing-based methods, the photoluminescence technique does not present any risk of altering wafer quality. In the imaging operation mode, this technique enables a complete photoluminescence image of the wafer to be obtained (instead of a photoluminescence signal limited to a small area of the wafer). The thermal donor concentration may thus be determined quickly in a plurality of regions of the test sample.

As shown on FIG. 1, the photoluminescence spectra of the seven reference samples exhibit a second intensity peak P2 in a (second) photon energy range extending approximately from 1.05 eV to 1.15 eV. This second intensity peak is related to band-to-band carrier recombinations and its amplitude is proportional to the majority free carrier concentration, usually noted "n" in an n-type semiconductor sample and "p" in a p-type semiconductor sample (in this specification, the notation "n" will be used whatever the doping type of the samples).

The majority free carrier concentration $n_{test}$ of the test sample may thus be determined in a way similar to that used for determining the thermal donor concentration $[TD]_{test}$.

A method for determining the majority free carrier concentration $n_{test}$ of the test sample, for example at the center of a CZ-Si wafer, will now be described. This method comprising the following steps:

providing a (p-type or n-type) reference sample of know majority free carrier concentration $n_{ref}$;

measuring with the photoluminescence tool the photoluminescence signal of the reference sample for at least one photon energy comprised between 1.05 eV and 1.15 eV;

determining, from the photoluminescence signal of the reference sample, a second experimental relationship (or calibration law) between the majority free carrier concentration n and a second parameter representative of the second intensity peak P2;

measuring (with the same photoluminescence tool and under the same measurement conditions as those used for the reference sample) a photoluminescence signal of the test sample for said for at least one photon energy between 1.05 eV and 1.15 eV;

determining from the photoluminescence signal of the test sample a specific value of the second parameter;

determining the majority free carrier concentration $n_{test}$ of the test sample from the specific value of the second parameter by using the second experimental relationship.

The reference sample used to measure the majority free carrier concentration $n_{test}$ of the test sample may be the same sample as that used to measure the thermal donor concentration $[TD]_{test}$ (step S11). In this case, the photoluminescence signal of the reference sample is advantageously measured for photon energies in the range [0.6 eV-0.85 eV] and in the range [1.05 eV-1.15 eV] in a single measuring operation. The two reference samples may alternatively be distinct.

The majority free carrier concentration $n_{ref}$ of the reference sample may be obtained, for example, from a resistivity measurement.

The second parameter representative of the second intensity peak P2 (i.e. relative to band-to-band carrier recombinations) may be of the same type as the first parameter representative of the first intensity peak P1 (i.e. relative to thermal donors). More exactly, the second parameter may be the photoluminescence signal intensity $I_{PL}$ for one photon energy comprised between 1.05 eV and 1.15 eV, preferably equal to 1.1 eV, or the integral of the photoluminescence signal intensity over at least a part of the photon energy range [1.05 eV-1.15 eV], and preferably over the entire energy range [1.05 eV-1.15 eV].

Except for the photon energy, the setup of the photoluminescence tool (i.e. the set of photoluminescence measurement conditions) in the method for determining the majority free carrier concentration is preferably the one described above (for the thermal donor concentration determining method).

Like the first correlation law, the second correlation law is preferably linear. The second correlation law is advantageously established with one reference sample (of know n) and the assumption of a value of the second parameter equal to zero for n=0. Alternatively, it can be made the assumption of a value of the second parameter equal to the background noise at 1.1 eV for n=0. The background noise value can be determined by extracting the photoluminescence intensity at a wavelength slightly larger than 1.1 eV (for instance 1.2 eV), by a photoluminescence measurement at 1.1 eV on a very resistive wafer (>1000 Ω·cm) (for which n is very low), from a measurement with the shutter closed or from a measurement with the laser turned off. The temperature variations in the camera may also be compensated by using values around 0.5 eV.

Figure 5:
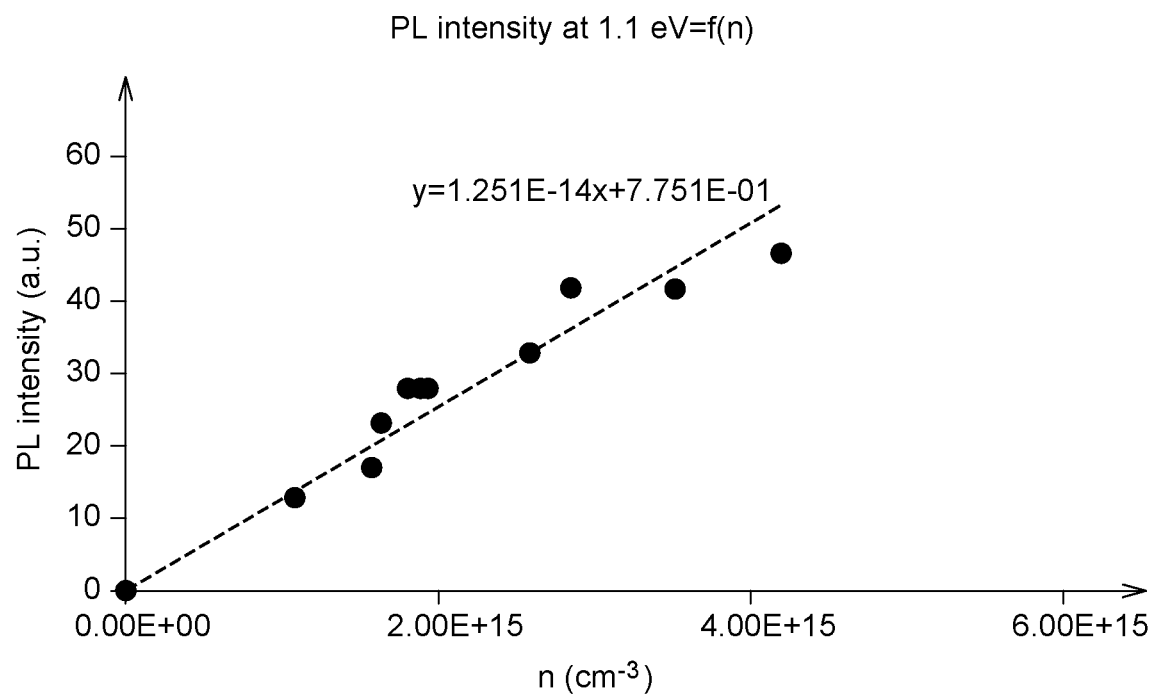
FIG. 5 shows a second calibration curve representing the photoluminescence peak intensity at 1.1 eV in function of the majority free carrier concentration.

FIG. 5 is an example of the second correlation law representing (in the form of a curve) the photoluminescence intensity at 1.1 eV as a function of the majority free carrier concentration n. Although one reference sample is necessary, this example of the second correlation law has been established with several reference samples using linear regression of the photoluminescence intensity values.

A method for determining the thermal donor concentration $[TD]_{test}$ of a test sample and a method for determining the majority free carrier concentration $n_{test}$ of the test sample have just been described. Both methods use photoluminescence measurements and have the same protocol. Reference sample(s) may thus be put in common and photoluminescence measuring steps performed simultaneously.

Taking advantages of these methods, it is also provided a fast and simple method for sorting wafers in an as-cut state. Steps S21 to S25 of this sorting method are described below in reference to FIG. 6.

Step S21 consists in determining the thermal donor concentration [TD] of each wafer to be sorted thanks to the determining method of FIG. 3. The thermal donor concentration [TD] is determined for at least one area of the wafer, preferably one located at the wafer center (as previously described).

The sorting method also comprises a step S22 of determining the majority free carrier concentration n of each wafer, in the area(s) where the thermal donor concentration [TD] has been determined.

In one preferred embodiment of the sorting method, the majority free carrier concentration n of each wafer is determined by applying the method described above, that uses photoluminescence measurements of the reference sample and of each wafer.

Step S21 and step S22 may be performed successively in any order, or concurrently when both photoluminescence-based methods are used. In particular, the photoluminescence signal of each wafer is advantageously measured for photon energies in the range [0.6 eV-0.85 eV] and in the range [1.05 eV-1.15 eV] in a single measuring operation.

The sorting method then comprises a step S23 of calculating a value of the bulk carrier lifetime $\tau_{bulk}$ in each wafer. This value of the bulk carrier lifetime $\tau_{bulk}$ is calculated from the thermal donor concentration [TD] determined at step S21 and from the majority free carrier concentration n determined at step S22. It is further made the assumption that, in the case of as-cut wafers (no surface passivation), the majority free carrier concentration n is substantially equal to the majority free carrier concentration at the thermodynamical equilibrium ($n_0$).

Step S23 of calculating the bulk carrier lifetime $\tau_{bulk}$ of each wafer preferably comprises two main operations.

First, the bulk lifetime limited by the presence of thermal donors, noted hereinafter "$\tau_{TD}$", is calculated for each wafer from the thermal donor concentration [TD] using the Shockley Read Hall (SRH) model and the teachings of document [«Recombination activity associated with thermal donor generation in monocrystalline silicon and effect on the conversion efficiency of heterojunction solar cells», Tomassini et al., Journal of Applied Physics 119, 084508, 2016].

More exactly, the thermal donors-limited bulk lifetime $\tau_{TD}$ may be calculated using the following equation:

$$\tau_{TD} = \tau_{SRH} = \frac{\frac{p_0 + p_1 + \Delta p}{\sigma_n \cdot N_T \cdot v_{th,e}} + \frac{n_0 + n_1 + \Delta p}{\sigma_p \cdot N_T \cdot v_{th,h}}}{p_0 + n_0 + \Delta p} \quad (1)$$

where:
$N_T$ is the density of recombination active defects (in $cm^{-3}$), given by the following relation:

$N_T = 0.1268 \times [TD] + 3,956.10^{13}$ $\sigma_n$ and $\sigma_p$ are the capture cross sections for electrons and holes respectively (in $cm^2$), given by the followings relations:

$\sigma_n = 3.16 \cdot 10^{-54} \times N_T^{2.41}$ $\sigma_p = 4.01 \cdot 10^{-40} \times N_T^{1.53}$ $v_{th,e}$ and $v_{th,h}$ are the thermal velocities for electrons and holes respectively;
$\Delta p$ is the injection level, set preferably between $10^{15}$ $cm^{-3}$ and $10^{16}$ $cm^{-3}$ to represent standard value of solar cells under operation;
$n_0$ and $p_0$ are the concentrations of electrons and holes respectively, at the thermodynamical equilibrium ($n_0 p_0 = n_i^2$); and
$n_1$ and $p_1$ are the densities of electrons and holes respectively, when the Fermi level coincide with the energy level E introduced by thermal donors:

$$n_1 = N_C \exp\left(\frac{E - E_C}{kT}\right)$$

$$p_1 = N_V \exp\left(\frac{E_V - E}{kT}\right)$$

In the last two relations, $N_c$ and $N_v$ are the effective densities of states of the conduction and valence bands respectively, k is the Boltzmann constant, T is the temperature and E is the position of the energy level associated to the thermal donors acting as SRH recombination centers (in eV):

$$E_c - E = 15.46 \times [TD]^{-0.12}.$$

The values for the terms k, Nc, Nv, $v_{th,e}$ and $v_{th,h}$ can be found in semiconductor physics textbooks.

Carrier recombination mechanisms other than SRH mechanism (i.e. recombinations assisted by defects like thermal donors) also limit the carrier bulk lifetime in silicon, in particular the Auger and radiative mechanisms. The Auger and radiative mechanisms are intrinsic to the semiconductor material, since they occur even in a perfectly pure semiconductor material. The strength of these intrinsic mechanisms does not depend on the presence of recombinant defects in the material, contrary to the SRH mechanism.

The effective value of the bulk carrier lifetime $\tau_{bulk}$ is therefore lower than the thermal donors-limited bulk lifetime $\tau_{TD}$ and may be calculated, during a second operation of step S23, using the following relation:

$$\tau_{bulk} = \frac{1}{\frac{1}{\tau_{TD}} + \frac{1}{\tau_{int}}} \quad (2)$$

where $\tau_{int}$ is the carrier lifetime limited by the intrinsic recombination mechanisms.

The carrier lifetime limited by the intrinsic recombination mechanisms $\tau_{int}$ can be calculated from the majority free carrier concentration n (or p), for example according to the relation given in the article ["Improved quantitative description of Auger recombination in crystalline silicon", Richter et al., Physical Review B 86, 165202, 2012].

More details regarding the calculation of the bulk carrier lifetime $\tau_{bulk}$ can be found in international application WO2018/046855, the content of which is incorporated here by reference.

Figure 6:
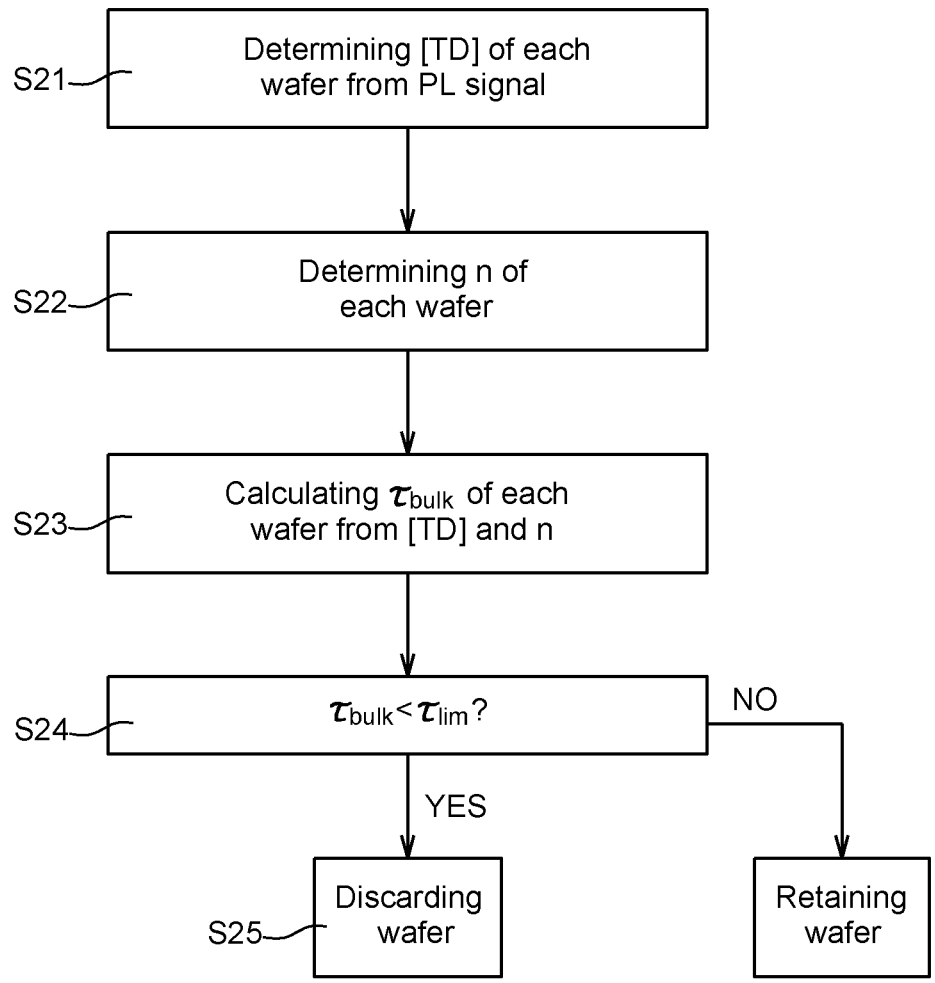
FIG. 6 represents steps of a method for sorting semiconductor wafers according to the second aspect of the invention.

Step S24 of FIG. 6 consists in comparing the value of the bulk lifetime $\tau_{bulk}$ calculated at step S23 with a lifetime threshold value $\tau_{lim}$. When the bulk lifetime value $\tau_{bulk}$ of a wafer is greater than the threshold value $\tau_{lim}$ (output "NO" at S24), the quality of the wafer can be considered as satisfactory. The wafer can therefore be retained. Conversely, when the bulk lifetime value $\tau_{bulk}$ is below the threshold value $\tau_{lim}$ (output "YES" at S24), the wafer is considered to be of poor quality. It is then discarded during a final step S25 of the sorting process.

The threshold value $\tau_{lim}$ is preferably set according to the performances of the solar cells expected by the manufacturers, taking into account the process used to manufacture these cells. It can be determined empirically by each solar cell manufacturer from a set of wafers, by comparing the bulk carrier lifetime of the wafers and the efficiency of the finished cells. It can also be obtained by means of cell performance simulations, these simulations taking into account the architecture of the cells. For example, for an optimized manufacturing process of silicon heterojunction (SHJ) solar cells, the maximum theoretical efficiency of which would be 24.5%, a lifetime threshold value $\tau_{lim}$ equal to 3 ms (for an injection level $\Delta p$ of $10^{15}$ cm$^{-3}$) would give a efficiency of at least 23.5% for all wafers retained at the end of the sorting method.

The value of the bulk lifetime $\tau_{bulk}$ calculated at step S23 is the best (i.e. the highest) value of the bulk lifetime $\tau_{bulk}$ that may be achieved in the selected area of the wafer, since defects other than thermal donors (like metallic impurities, oxide precipitates . . . ) have not been taken into consideration. The real (or effective) value of bulk lifetime $\tau_{bulk}$ will thus be lower than the calculated one, due to these defects (which are unknown or which cannot be quantified). In spite of this, the sorting method based on the calculated value of bulk lifetime $\tau_{bulk}$ will enable most of the bad quality wafers to be discarded.

As an example, the photoluminescence intensity of an n-type CZ-Si wafer was measured with a photoluminescence tool (after calibration of the tool). At the wafer center, photoluminescence intensity at 0.72 eV was measured to be 17 counts, corresponding to [TD]=$10^{15}$ cm$^{-3}$ (step S21), while the photoluminescence intensity at 1.1 eV was measured to be 45 counts, yielding to $n_0$=3.5×$10^{15}$ cm$^{-3}$ (step S22). By performing step S23 of the sorting method, bulk carrier lifetime $\tau_{bulk}$ was calculated to be 1.37 ms for an injection level of $10^{15}$ cm$^{-3}$. This means that the maximum achievable lifetime of the solar cell produced from this wafer (if thermal donors are not intentionally destroyed by a specific treatment, which is the case for heterojunction cells) will be 1.37 ms at this injection level. As other— unknown—recombination active SRH centers are likely to be present in the wafer, the effective bulk lifetime (measured after surface preparation and passivation layer deposition) may be lower than this calculated value. The wafer would be discarded in the example of a lifetime threshold value $\tau_{lim}$ equal to 3 ms.

The determining method of FIG. 3 or the sorting method of FIG. 6 can be advantageously used to perform an in-line systematic control of as-cut wafers, prior to a high efficiency solar cell manufacturing process. There is indeed a demand for such a control for both silicon heterojunction (SHJ) and silicon homojunction (SHMJ) solar cells. Even if thermal donors are no longer present in silicon substrates after typical SHMJ manufacturing processes, wafers featuring high thermal donor concentration generally lead to lower conversion efficiencies of SHMJ cells, due to formation of recombination active oxide precipitate. The methods disclosed above are therefore also of high interest for the manufacturing of such cells (even if the obtained values of the carrier lifetime/thermal donor concentration will not be representative of the finished cells). Depending on the SHMJ process, there can for instance exist a threshold value for $\tau_{bulk}$ or [TD] beyond which the efficiency is observed to be reduced.

In addition to the wafers in the as-cut state, the determining method of FIG. 3 and the sorting method of FIG. 6 may also be applied to wafers in a surface-shaped state, i.e. to as-cut wafers that have been subjected to a surface-shaped step such as a chemical mechanical planarization (CMP) step or a texturing step.

Whatever the wafer state (as-cut state or surface-shaped state), the wafers to be characterized or sorted are exempt of passivation layer and have not been subjected to a annealing step above 350° C. or to a passivation step.

The methods of the invention are not limited to samples made of (Czochralski) single-crystal silicon. They are also applicable to multicrystalline silicon samples, in which the same thermal donor-related photoluminescence peak is observed at room temperature, as well as to germanium samples, since thermal donors are also known to form in this material.

Finally, the methods of the invention may be applied to any form of sample, for example ingots, slabs, wafers (or slices), powders . . .

The invention claimed is:

1. A method for determining the thermal donor concentration of a test sample made of a semiconductor material, comprising:
   providing a reference sample made of the same semiconductor material and having a known thermal donor concentration;
   measuring with a photoluminescence tool a photoluminescence signal of the reference sample for at least one photon energy comprised between 0.65 eV and 0.8 eV, the photoluminescence signal of the reference sample exhibiting an intensity peak in a photon energy range of 0.65 eV to 0.8 eV;
   determining, from the photoluminescence signal of the reference sample, an experimental relationship between the thermal donor concentration and a parameter representative of the intensity peak;
   measuring with the photoluminescence tool a photoluminescence signal of the test sample for at least one photon energy comprised between 0.65 eV and 0.8 eV;
   determining from the photoluminescence signal of the test sample a specific value of said parameter; and
   determining the thermal donor concentration of the test sample from the specific value of said parameter by using said experimental relationship.

2. The method according to claim 1, wherein said experimental relationship is linear.

3. The method according to claim 1, wherein said parameter is the photoluminescence signal intensity obtained for one photon energy comprised between 0.65 eV and 0.8 eV.

4. The method according to claim 3, wherein said photon energy comprised between 0.70 eV and 0.75 eV.

5. The method according to claim 1, wherein said parameter is the integral of the photoluminescence signal intensity over at least a part of the photon energy range of 0.65 eV to 0.8 eV.

6. The method according to claim 1, wherein the reference sample has a known thermal donor concentration greater than $5 \times 10^{14}$ cm$^{-3}$.

7. A method for sorting wafers in an as-cut state or in a surface-shaped state, the wafers being made of a semiconductor material, the method comprising:
   providing a reference sample made of the same semiconductor material and having a known thermal donor concentration;
   measuring with a photoluminescence tool a photoluminescence signal of the reference sample for at least one first photon energy comprised between 0.65 eV and 0.8 eV, the photoluminescence signal of the reference sample exhibiting a first intensity peak in a first photon energy range of 0.65 eV to 0.8 eV;
   determining, from the photoluminescence signal of the reference sample, a first experimental relationship between the thermal donor concentration and a first parameter representative of the first intensity peak;
   measuring with the photoluminescence tool a photoluminescence signal of each wafer for at least the first photon energy;
   determining from the photoluminescence signal of each wafer a specific value of said first parameter;
   determining the thermal donor concentration of each wafer from the specific value of said first parameter by using said first experimental relationship;
   determining the majority free carrier concentration of each wafer;
   calculating a value of the bulk carrier lifetime of each wafer from the thermal donor concentration and the majority free carrier concentration of each wafer;
   comparing the value of the bulk carrier lifetime of each wafer to a threshold value; and
   excluding the wafer when the value of the bulk carrier lifetime is lower to the threshold value.

8. The method according to claim 7, wherein the determination of the majority free carrier concentration of each wafer comprises:
   determining the majority free carrier concentration of the reference sample;
   measuring with the photoluminescence tool the photoluminescence signal of the reference sample for at least one second photon energy comprised between 1.05 eV and 1.15 eV, the photoluminescence signal of the reference sample exhibiting a second intensity peak in a second photon energy range of 1.05 eV to 1.15 eV;
   determining, from the photoluminescence signal of the reference sample, a second experimental relationship between the majority free carrier concentration and a second parameter representative of the second intensity peak;
   measuring with the photoluminescence tool the photoluminescence signal of each wafer for at least the second photon energy;
   determining from the photoluminescence signal of each wafer a specific value of said second parameter; and
   determining the majority free carrier concentration of each wafer from the specific value of said second parameter by using said second experimental relationship.

9. The method according to claim 8, wherein the photoluminescence signal of the reference sample is measured for at least the first photon energy and for at least the second photon energy in a single measuring operation.

10. The method according to claim 8, wherein the photoluminescence signal of each wafer is measured for at least the first photon energy and for at least the second photon energy in a single measuring operation.

11. The method according to claim 7, wherein the photoluminescence signal of each wafer is measured at the wafer center.

* * * * *